(12) United States Patent
Zait

(10) Patent No.: US 10,602,413 B2
(45) Date of Patent: Mar. 24, 2020

(54) POLICY STATE PROPAGATION SYSTEM

(71) Applicant: T-Mobile USA, Inc., Bellevue, WA (US)

(72) Inventor: Hichem Zait, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 34 days.

(21) Appl. No.: 15/859,510

(22) Filed: Dec. 30, 2017

(65) Prior Publication Data

US 2019/0208450 A1    Jul. 4, 2019

(51) Int. Cl.
| | |
|---|---|
| *H04W 36/22* | (2009.01) |
| *H04W 36/14* | (2009.01) |
| *H04W 36/30* | (2009.01) |
| *H04W 48/14* | (2009.01) |
| *H04W 4/02* | (2018.01) |
| *H04W 12/06* | (2009.01) |

(52) U.S. Cl.
CPC .......... *H04W 36/14* (2013.01); *H04W 36/22* (2013.01); *H04W 36/30* (2013.01); *H04W 48/14* (2013.01); *H04W 4/02* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 2009/0319848 A1* | 12/2009 | Thaper | ...................... | G06F 8/64 714/748 |
| 2010/0234042 A1* | 9/2010 | Chan | ................. | H04W 36/0061 455/453 |
| 2014/0242916 A1* | 8/2014 | Bellamkonda | .......... | H04L 47/11 455/67.11 |
| 2015/0173008 A1* | 6/2015 | Siddam | ................. | H04W 48/18 455/434 |
| 2016/0337950 A1* | 11/2016 | Navas Cornejo | ..... | H04W 48/14 |
| 2017/0078905 A1* | 3/2017 | Kasslin | ................. | H04W 48/20 |

* cited by examiner

*Primary Examiner* — Kodzovi Acolatse
*Assistant Examiner* — The Hy Nguyen
(74) *Attorney, Agent, or Firm* — Han Santos, PLLC

(57) ABSTRACT

This disclosure describes techniques that cause a client device to initiate a policy-pull request to retrieve a policy update associated with the client device. Particularly, a Policy State Propagation (PSP) System may transmit a policy-pull notification to client device that is configured to cause the client device to initiate a request to retrieve the policy update, thereby substantially eliminating a delay between an actual policy update by the telecommunications service provider, and the client device receiving the policy update. The policy update may be based on an update of client profile data or network analytics data associated with operations of the client device on the telecommunications network. Further, the PSP system may generate a policy update data packet that includes the policy update. The PSP system may selectively transmit the policy update data packet to the client device in response receiving the policy-pull request, and further authenticating the client device.

20 Claims, 5 Drawing Sheets

POLICY STATE PROPAGATION SYSTEM

BACKGROUND

Present day, telecommunications service providers may attempt to mitigate network congestion and maintain a particular Quality of Experience (QoE) by generating and transmitting policy updates to client devices operating on the telecommunications network. In some examples, policy updates may include policy rules that govern availability and accessibility of cellular and non-cellular data network. Particularly, client devices may receive scheduled, and unscheduled, policy updates based on anticipated and unexpected changes to network conditions. Each client device may receive a policy update by first initiating a policy-pull request, which occurs according to a predetermined schedule. However, initiating a policy-pull request according to a predetermined schedule may cause the client device to experience a delay between the telecommunication service provider making a policy update available and the client device receiving the policy update.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
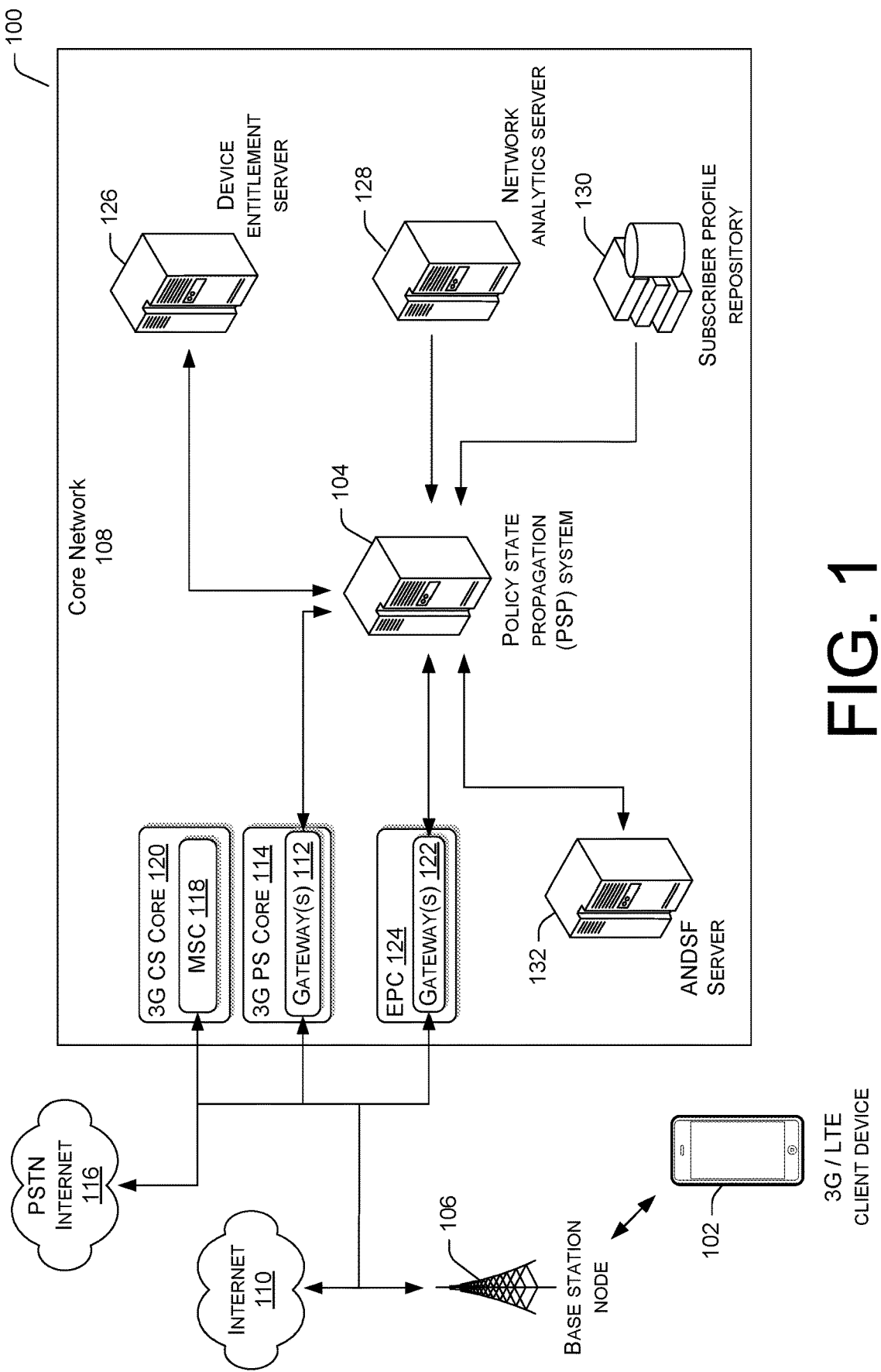
FIG. 1 illustrates a schematic view of a computing environment that facilitates a fast propagation of a policy update, or a notification, to a client device operating on a telecommunications network.

This disclosure describes techniques that cause a client device to initiate a policy-pull request to retrieve a policy update. Particularly, the policy-pull request is configured to occur at a substantially same time as an update to an existing policy, thereby substantially eliminating a delay between the actual policy update, and the client device receiving the policy update. Particularly, a Policy State Propagation (PSP) System may cause the client device to initiate a policy-pull request that is intended to retrieve a policy update from a core network of a telecommunications network. In one example, the PSP System may receive an update of client data associated with a client device operating on a telecommunications network. The client data may comprise of an update to client profile data associated with a client device operating on the telecommunication network. Client profile data may include, but is not limited to, a client device identifier, residential and business geographic location, preferred social media platforms, and network subscriber plan. Further, the client device identifier may include a Public Land Mobile Network ID (PLMN ID) or a Mobile Station International Subscriber Directory Number (MSISDN), or an International Mobile Subscriber Identity (IMSI).

In this example, the PSP system may receive an update of client data from a subscriber profile repository associated with the telecommunications network. The PSP system may monitor the subscriber profile repository for updates to client profile data on a continuous basis, per a predetermined schedule, or in response to a triggering event. The predetermined schedule may be based on a time interval of thirty minutes, one hour, 12 hours, or 24 hours. Any time interval is possible. Further, the triggering event may correspond to receiving of an indication of, or an update of, client profile data from the subscriber policy repository.

In another example, the PSP system may receive network analytics data from a network analytics server. Network analytics data may include location data associated with the client device, an indication of network congestion at a location of the client device, and an indication of network congestion at locations that are substantially proximate to the current location of the client device. An indication of network congestion may be presented as an available bit-rate or available bandwidth relative to a total bit-rate or total bandwidth location at a particular location.

In one non-limiting example, the PSP system may preemptively determine that a client device is likely to be affected by network congestion at a location proximate to its current location by retrieving a client profile associated with the client device, from a subscriber profile repository. The client profile may include a historical record of location data associated with the client device. The PSP system may use the historical record of location data to determine a likelihood that the client device will enter a location that is proximate to a current location of the client device.

Additionally, the PSP system may retrieve, from a network analytics data store, historical records of network congestion associated with current and proximate locations of the client device. In doing so, the PSP system may further determine a likely duration of network congestion based at least in part on the historical records of network congestion. By determining a likely duration of network congestion at a location proximate to the client device, the PSP system may further determine a likelihood that the client device will enter the proximate location during a period of network congestion. For example, the PSP system may determine that a client device may move into a proximate location after one hour. The PSP system may further determine that network congestion at the proximate location will likely dissipate in less than one hour. Thus, the PSP system may ultimately determine that the client device is unlikely to be affected by network congestion at the proximate location, since network congestion is likely to dissipate before the client device moves into the proximate location.

Moreover, the PSP system may determine whether the client data (i.e., update to client profile data or network analytics data) affects an existing policy associated with an operation of the client device on the telecommunications network. The existing policy, as described herein, may include one or more policy rules that govern availability and accessibility of non-cellular data networks, such as WiFi or WiMax. The one or more policy rules may be configured to ease cellular network congestion by offloading a client device onto a non-cellular data network during periods of network congestion (i.e., high volume bandwidth consumption of a cellular network).

Particularly, a policy rule may offload a client device onto a non-cellular data network in response to determining that an indication of network congestion is greater than a predetermined congestion threshold. The predetermined congestion threshold may be set by a network subscriber plan associated with the client device, an operator of the telecommunications network, or a combination of both. In another example, a policy rule may selectively offload a client device onto a non-cellular data network to maintain a particular Quality of Experience (QoE) for data communications on the client device. A measure of QoE may be based on a real-time bit-rate or bandwidth allocation that associated with data communication on the client device. Thus, a policy rule may selectively offload a client device onto a non-cellular network in response to determining that the measure of QoE is less than a predetermined QoE threshold. The predetermined QoE threshold may be set by a network subscriber plan associated with the client device, an operator of the telecommunications network, or a combination of both.

In a non-limiting example, the PSP system may determine whether client data affects an existing policy associated with the client device, based on a measure of current QoE relative to a predetermined QoE threshold. Particularly, the PSP system may determine a current QoE associated with an operation of the client device on the telecommunications network, based at least in part on the network analytics data. Further, the PSP system may retrieve, from a subscriber profile repository, a client profile associated the client device that includes an indication of a predetermined QoE threshold associated with the client device. Thus, the PSP system may determine whether the client data affects the existing policy by comparing the current QoE and the predetermined QoE threshold.

Additionally, or alternatively, the existing policy may include policy rules that selectively retain a client device on a cellular network, in response to a determination that the QoE on the cellular data network is greater than the QoE on the non-cellular data network, or the QoE on the non-cellular data network is less than a predetermined QoE threshold, or a combination of both. Further, an existing policy may also include one or more policy rules that apply to particular locations, times of day, days of the week, events, venue offerings, or any combination thereof.

In response to determining that the client data (i.e., update of client profile data or network analytics data), does affect an existing policy that governs availability and accessibility of non-cellular data networks, the PSP system may generate a policy update data packet that includes at least one policy rule to offload the client device onto a non-cellular network. In one example, the policy update data packet may include new policy rules, or adjustments to existing policy rules that offload a client device onto a non-cellular data network in response to unexpected network congestion at a current location of the client device that is greater than a predetermined congestion threshold. In this example, the PSP system may determine that to relieve the unexpected network congestion, policy rules within the existing policy should be adjusted, or created, to offload the client device onto a non-cellular data network.

Moreover, the policy update data packet may include new policy rules, or adjustments to existing policy rules that preemptively determine that a client device may be affected by network congestion or impeded by a QoE at a next location that is proximate to a current location. Particularly, the PSP system may employ machine learning algorithms to predict a next location of the client device that is likely to occur within a predetermined time interval, based at least in part on a historical record of location data and time stamps associated with the client device. In doing so, the PSP system may preemptively determine that a client device will be affected by network congestion, or impeded by a QoE, within a predetermined time interval. Further, the PSP system may configure the policy update data packet to preemptively offload the client device onto a non-cellular data network that is available or accessible at the proximate location.

Further, the PSP system may transmit a policy-pull notification to the client device. The policy-pull notification may cause the client device to initiate a policy-pull request for an update to an existing policy. For example, rather than the client device adhering to a predetermined schedule for initiating a policy-pull request, the PSP system may cause the client device to initiate a policy-pull request at a substantially same time as generating an update to the existing policy, thus substantially eliminating the time difference between the client device receiving an update to an existing policy, and the actual policy update, itself.

In some examples, the PSP system may receive an authentication token with the policy-pull request from the client device. The authentication token may be based on an initial authentication of the client device with a device entitlement server of the telecommunications network. For example, the device entitlement server may authenticate and store authentication credentials received from the client device, and in doing so, transmit the authentication token to the client device (or an over-the-top application associated with the client device) for use during a communication session via the telecommunications network.

Thus, the PSP system may transmit the policy update data packet to the client device in response to verifying an authenticity of the authentication token. Alternatively, the PSP system may transmit the policy update data packet an access server, such as an Access Network Discovery and Selection Function (ANDSF) server, along with computer executable instructions that cause further transmission of the policy update data packet to the client device. The ANDSF server may assist the PSP system to discover non-3GPP access networks, such as WiFi or WiMax, that can be used for data communications in addition to the 3GPP access network.

Additionally, the PSP system may generate and initiate transmission of a notification to the client device, based on location data of the client device, network congestion at a current or proximate location associated with the client device, an update to client profile data associated with the client device, or any combination thereof. For example, the PSP system may identify an event or venue offering that is associated with a current or proximate location of the client device. In doing so, the PSP system may transmit, or cause an access server to transmit, notification to the client device that is based the event or the venue offering.

Similarly, the PSP system may transmit a notification to the client device indicating an update to client profile data associated with the client device. Alternatively, or additionally, the notification may indicate a network congestion status or a QoE status at a current location or a proximate location associated with the client device. Further, the PSP system may be configured to transmit a notification to the client device, irrespective of whether the update to client profile data, network congestion status, or QoE status, affects an existing policy associated with the client device.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment 100 that facilitates a fast propagation of a policy update, or a notification, to a client device 102 operating on a telecommunications network. Particularly, a Policy State Propagation (PSP) System 104 may transmit a policy-pull notification to a client device 102 that causes the client device 102 to initiate a policy-pull request of an update to an existing policy. The policy update may be associated with an update to client profile data associated with the client device 102, or network analytics data associated with an operation of the client device 102 on the telecommunication network, or a combination of both. Alternatively, or additionally, the PSP System 104 may transmit a notification to the client device 102, based on the update to a client profile data or the network analytics data.

In the illustrated example, a telecommunications service provider may provide telecommunications and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The computing environment 100 May include base station node(s) 106 and a core network 108. The base station node(s) 106 are responsible handling voice and data traffic between client devices, such as client device 102, and the core network 108 via air interfaces. The core network 108 may provide telecommunication and data communication services to multiple client devices, such as a 3G-compatible client device and an LTE an LTE-compatible client device, collectively referred to as client device 102. The client device 102 may include any sort of electronic device, such as a cellular phone, a smart phone, a tablet computer, an electronic reader, a media player, a gaming device, a personal computer (PC), a laptop computer, etc. The client device 102 may include a subscriber identity module (SIM), such as an eSIM, to identify the client device 102 to a telecommunication service provider network (also referred to herein, as "telecommunication network").

The core network 108 may include 3G domain components that support 3G data traffic and 3G voice traffic. For example, 3G data traffic between a 3G-compatible, client device 102 and the Internet 110 may be routed through one or more gateway(s) 112 of a 3G Packet Switch (PS) Core 114. Additionally, 3G voice traffic between the 3G-compatible, client device 102 and the Public Switched Telephone Network (PSTN) 116 may be routed through a Mobile Switch (MSC) 118 of the 3G Circuit Switch (CS) core 120.

Additionally, the core network 108 may further include LTE-domain components that support LTE data voice and LTE data traffic. For example, LTE data traffic between an LTE-compatible, client device 102 and the Internet 110 may be routed through one or more gateway(s) 122 of the Evolved Packet Core (EPC) 124. Moreover, Voice over LTE (VoLTE) enables the transmission of voice calls over the LTE-domain of the core network 108.

In the illustrated example, the core network 108 may further include the PSP System 104, a device entitlement server 126, a network analytics server 128, a subscriber profile repository 130, and an Access Network Discover and Selection Function (ANSDF) server 132. Particularly, the PSP System 104 may receive an update of client profile data from the subscriber profile repository 130. The update of client profile data may be based on a direct interaction between the subscriber profile repository 130 and one or more partner services of the telecommunication network. Alternatively, the subscriber profile repository 130 may fetch and store a current version of client profile data from a network access platform that consolidates data from partner services, and selectively pushes an update of client profile data to the subscriber profile repository 130. The PSP System 104 may also receive network analytics data from a network analytics server 128. The network analytics data may include location data associated with the client device 102, an indication of network congestion at one or more locations associated with the client device 102, or a combination of both. In some examples, the network analytics server 128 may push network analytics data to the PSP System 104 in response to a change in location of a client device 102, or in response to an indication of network congestion (i.e., real-time network congestion being greater than a predetermined congestion threshold) at a location that is substantially similar to, or proximate to, the location of the client device 102. The client device 102 may be considered substantially proximate to a particular location based on a likelihood that the client device 102 is to move into the proximate location within a predetermined time interval. The predetermined time interval may correspond to five minutes, thirty minutes, or one hour. Any time interval is possible, provided the predetermined time interval is associated with an occurrence at the proximate location, such as an event, a venue offering, or an instance of network congestion.

In the illustrated example, the PSP System 104 may analyze an update of client profile data, network analytics data, or combination of both, to determine whether the update of client profile data or network analytics data warrants a change to an existing policy associated with the client device 102. The existing policy may include one or more policy rules that govern availability and accessibility of non-cellular data networks, such as WiFi or WiMax, based on an indication of network congestion or a Quality of Experience (QoE) associated with data communications via the client device 102. In some examples, the PSP System 104 may retrieve an existing policy associated with the client device 102 from a Policy and Charging Control (PCC) associated with the telecommunication network, a client policy repository associated with an ANDSF server 132 or a policy repository accessible via the ANDSF server.

Further, the PSP System 104 may generate a policy update data packet that is intended to update the existing policy of the client device 102, based at least in part on the update of client profile data or network analytics data. In doing so, the PSP System 104 may transmit a policy-pull notification to the client device 102, or via the ANDSF server 132 to the client device 102. The policy-pull notification is intended to cause the client device 102 to initiate a policy-pull request to retrieve an update to an existing policy, an update of client profile data, or a combination of both.

In response to receiving a policy-pull notification, the client device 102 may transmit a policy-pull request to the PSP System 104. The policy-pull request may include an authentication token that is associated with the client device 102. The authentication token may be based on an initial authentication of the client device 102 with a device entitlement server 126 of the telecommunications network. Further, the PSP System 104 may verify an authenticity of the authentication token with the device entitlement server, and in doing so, transmit the policy update data packet directly to the client device 102, or cause the ANSDF server 132 to transmit the policy update data packet to the client device 102.

In some examples, the PSP System 104 may selectively transmit a notification directly to the client device 102 or cause the ANSDF server 132 to transmit the notification to the client device 102.

The content of the notification may be based on an update of client profile data or network analytics data. In some examples, the notification may or may not be accompanied with an update to an existing policy, or update of client profile data that is associated with the client device. The notification may be an informational message related to a current location of the client device 102, such as an event notification, a venue offering notification, or an informational message related to network congestion at a current location, or proximate location to the client device 102.

In the illustrated example, the PSP System 104 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interface(s) to enable communications with other networked devices, such as one of client device 102.

Figure 2:
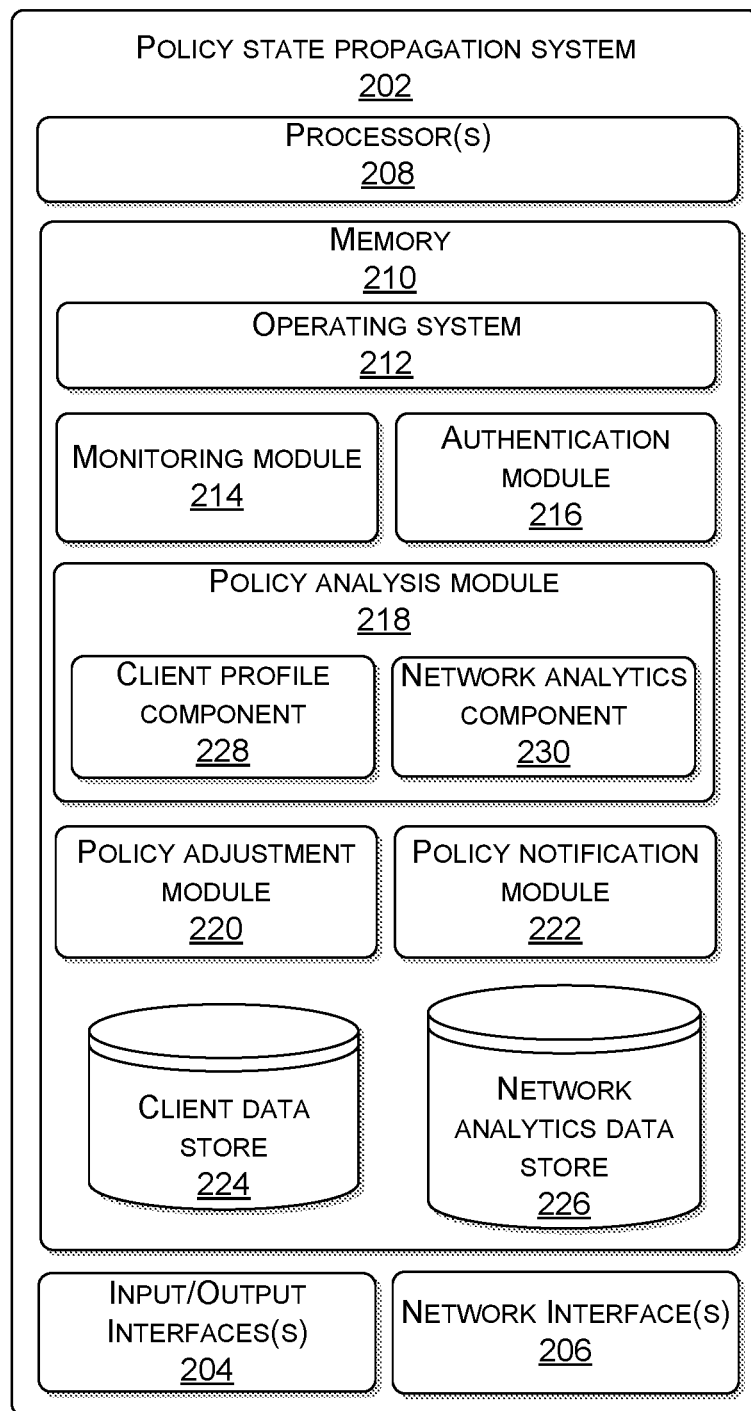
FIG. 2 illustrates a block diagram of a Policy State Propagation (PSP) System that causes a client device to update an existing policy associated with the client device operating on a telecommunications network.

FIG. 2 illustrates a block diagram of a Policy State Propagation (PSP) System 202 that causes a client device to initiate an update of an existing policy associated with an operation of the client device on a telecommunications network. In one example, the PSP System 202 may cause the client device to initiate a policy-pull request that is intended to retrieve a policy update from a core network of the telecommunications network. The PSP System 202 may generate the policy update based on detecting changes in client profile data associated with the client device, network analytics data associated with an operation of the client device on the telecommunications network, or a combination of both.

The PSP system 202 may include routines, program instructions, objects, and/or data structures that perform particular tasks or implement abstract data types. Further, the PSP system may include input/output interface(s) 204. The input/output interface(s) 204 may include any type of output interface known in the art, such as a display (e.g., a liquid crystal display), speakers, a vibrating mechanism, or a tactile feedback mechanism. Input/output interface(s) 204 also include ports for one or more peripheral devices, such as headphones, peripheral speakers, or a peripheral display. Further, the input/output interface(s) 204 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the PSP system 202 may include network interface(s) 206. The network interface(s) 206 may include any sort of transceiver known in the art. For example, the network interface(s) 206 may include a radio transceiver that performs the function of transmitting and receiving radio frequency communications via an antenna. In addition, the network interface(s) 206 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the network interface(s) 206 may include wired communication components, such as an Ethernet port or a Universal Serial Bus (USB).

Further, the PSP system 202 may include one or more processor(s) 208 that are operably connected to memory 210. In at least one example, the one or more processor(s) 208 may be a central processing unit(s) (CPU), graphics processing unit(s) (GPU), a both a CPU and GPU, or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 208 may also be responsible for executing all computer applications stored in the memory, which can be associated with common types of volatile (RAM) and/or nonvolatile (ROM) memory.

In some examples, memory 210 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include an operating system 212, a monitoring module 214, an authentication module 216, a policy analysis module 218, a policy adjustment module 220, a policy notification module 222, an authentication module 216, a client data store 224, and a network analytics data store 226. The operating system 212 may be any operating system capable of managing computer hardware and software resources.

Further, the monitoring module 214 may monitor a subscriber policy repository associated with the telecommunications network to detect updates to client profile data associated with a client device. The monitoring module 214 may monitor the subscriber policy repository on a continuous basis, per a predetermined schedule, or in response to a triggering event. The predetermined schedule may be based on a time interval of thirty minutes, one hour, 12 hours, or 24 hours. Any time interval is possible. Further, the triggering event may correspond to receiving of an indication of, or an update of, client profile data from the subscriber policy repository.

In the illustrated example, the policy analysis module 218 may further include a client profile component 228 and a network analytics component 230. The client profile component 228 may parse through an update of client profile data to determine whether the update affects an existing policy associated with the client device. In doing so, the client profile component 228 may create, or adjust, one or more policy rules associated with the existing policy, based at least in part on the updated client profile data.

Further, the client profile component 228 may retrieve an existing client profile from a client data store 224 to compare with the update of client profile data. In a non-limiting example, the client profile component 228 may determine that an update of client profile data does affect an existing policy associated with the client device. For example, the update of client profile data may include a change to a network subscriber plan. The change in network subscriber plan may, in turn, affect one or more policy rules associated with a QoE threshold associated with data communications over the telecommunications network. In this example, the network subscriber plan may indicate that a client device is to be preferentially offloaded on a non-cellular data network in response to a determination that the QoE on the cellular data network is less than a predetermined QoE threshold associated with the network subscriber plan. Alternatively, the network subscriber plan may indicate that the client device is to be preferentially retained on the cellular network, while other client devices are offloaded onto non-cellular data networks, in response to a determination that the QoE on the cellular data network is greater than the QoE on the non-cellular data network, or the QoE on the non-cellular data network is less than the predetermined QoE threshold associated with the network subscriber plan, or a combination of both.

Therefore, in response to determining that an update to client profile data may affect an existing policy associated with the client device, the client profile component 228 may create, or adjust, one or more policy rules associated with an existing policy.

In the illustrated example, the network analytics component 230 may determine whether network analytics data affects an existing policy associated with the client device. The network analytics component 2# may retrieve the existing policy from a Policy and Charging Control (PCC) associated with the telecommunications network, an ANDSF server, or a policy repository accessible via the ANDSF server.

In doing so, the network analytics component 230 may create, or adjust, one or more policy rules associated with the existing policy, based at least in part on the network analytics data. Network analytics data may include location data associated with the client device, a first indication of network congestion within telecommunications network at a substantially same location as the client device, and a second indication of network congestion within the telecommunications network at geographic regions that are substantially proximate to the location of the client device. In some examples, a geographic region is deemed substantially proximate to the location of the client device if the client device is likely to move into the proximate location within a predetermined time interval. The predetermined time interval may correspond to five minutes, thirty minutes, or one hour. Any time interval is possible, provided the predetermined time interval is substantially similar to or less than an estimated duration of network congestion at the proximate location.

Additionally, the network analytics component 230 may employ machine learning algorithms to preemptively determine whether a client device may be affected by network congestion or impeded by a QoE at a next, particular geographic location of the client device, or within an immediate future time period, or a combination of both. The immediate future time period may be five minutes, thirty minutes, or one hour. Any future time period is possible, provided the future time period is substantially similar to or less than an estimated duration of network congestion at the particular geographic location.

Particularly, the network analytics component 230 may predict a next location of the client device within a future time period by parsing through a historical record of location data and time stamps associated with the client device. Further, the network analytics component 230 may estimate a duration of network congestion at a particular location based at least in part on a historical record of network congestion at the particular location.

In response to determining that network analytics data may affect an existing policy associated with a client device, the network analytics component 230 may create, or adjust, one or more policy rules associated with the existing policy. For example, the network analytics data may indicate that the location of the client device is, unexpectedly, experiencing network congestion that is greater than a predetermined congestion threshold. Thus, the network analytics component 230 may determine that to relieve the unexpected network congestion, policy rules within the existing policy are to be created, or adjusted to offload the client device onto a non-cellular data network.

The policy adjustment module 220 may generate a policy update packet, based at least in part on an updated of client profile data or network analytics data. Particularly, the policy update packet may incorporate one or more new, or modified, policy rules associated with an existing policy of a client device that are established by at least one of the client profile component 228 or the network analytics component 230 of the policy analysis module 218. In some examples, the policy update packet may also include an update to client profile data.

In some examples, the policy adjustment module 220 may transmit a policy-pull notification to a client device indicating that a policy update is available. The policy pull-message is intended to instruct a client device to initiate a policy-pull request to receive an update to an existing policy, an update to client profile data, or a combination of both. The update to the existing policy may be based at least in part on the update to policy rules established by at least one of the client profile component 228 or the network analytics component 230 of the policy analysis module 218.

The policy adjustment module 220 may transmit the policy-pull notification directly to the client device. Alternatively, the policy adjustment module 220 may cause an access server associated with the telecommunications network, such as an ANDSF server, to transmit the policy-pull notification to the client device.

Additionally, the policy adjustment module 220 may receive an indication of a policy-request from a client device that had been initiated by the policy-pull notification. In doing so, the policy notification module 222 may transmit the policy update data packet to the client device, or cause an access server associated with the telecommunications network, such as an ANDSF server, to transmit the policy update data packet to the client device. In some examples, the policy notification module 222 may transmit, or cause transmission of, the policy update data packet in response to the authentication module 216 verifying an authenticity of an authentication token associated with the policy-request.

In the illustrated example, the policy notification module 222 may generate a notification for transmission to a client device that notifies the client device of an update to client profile data, or a status of network congestion. The notification may be based at least in part on an update of client profile data or an analysis of network analytics data by the policy analysis module 218. In one example, the notification may indicate an update of client profile data associated with the client device. The notification may further indicate whether an existing policy associated with the client device has been updated in response to an update of client profile data.

In another example, the notification may indicate that the client device is likely to experience network congestion at a particular geographic location, during a particular time interval, at a particular event, at a particular venue, or any combination thereof. The notification may further recommend that the client device offload to a non-cellular data network to maintain a QoE and relieve network congestion.

The policy notification module 222 may transmit the notification directly to the client device. Alternatively, the policy notification module 222 may cause an access server associated with the telecommunications network, such as an ANDSF server, to transmit the notification to the client device.

In the illustrated example, the authentication module 216 may authenticate an authentication token associated with a policy-pull request received from a client device. In some examples, a client device may include an authentication token with a policy-pull request (i.e., responsive to a policy-pull notification from the PSP system 202) for an update of an existing policy. The authentication token may be based on an initial authentication of the client device with a device entitlement server of the telecommunications network. In this example, the authentication module 216 may verify an authenticity of the authentication token with the device entitlement server of the telecommunications network. In response to doing so, the authentication module 216 may instruct the policy adjustment module 220 to transmit a policy update data packet that is associated with the policy-pull request. Alternatively, if the authentication module 216 fails to verify an authenticity of the authentication token, the authentication module 216 may instruct the policy adjustment module 220 to withhold transmission of the policy update data packet.

The client data store 224 may include a historical record of client profile data associated with the client device. Client profile data may include, but is not limited to, a client device identifier (i.e., PLMN ID, IMSI, or MSISDN), residential and business geographic location, preferred social media platforms, network subscriber plan, and so forth. Further, the client data store 224 may include a historical record of location data and time stamps associated with the client device. In some examples, the historical record of location data and time stamps may be used by the network analytics component 230 of the policy analysis module 218 to determine preemptively whether a client device may be affected by network congestion within a predetermined period of time, or at a geographic location that is proximate to the current location of the client device.

The network analytics data store 226 include a historical record of network congestion at one or more geographic locations. The historical records may include location data associated with instances of network congestion, and time stamps that define a duration of the instances of network congestion. In some examples, the historical records of network congestion may be used to determine whether a client device may preemptively be affected by network congestion or impeded by a QoE at a next geographic location of the client device, or within an immediate future time period, or a combination of both.

Figure 3:
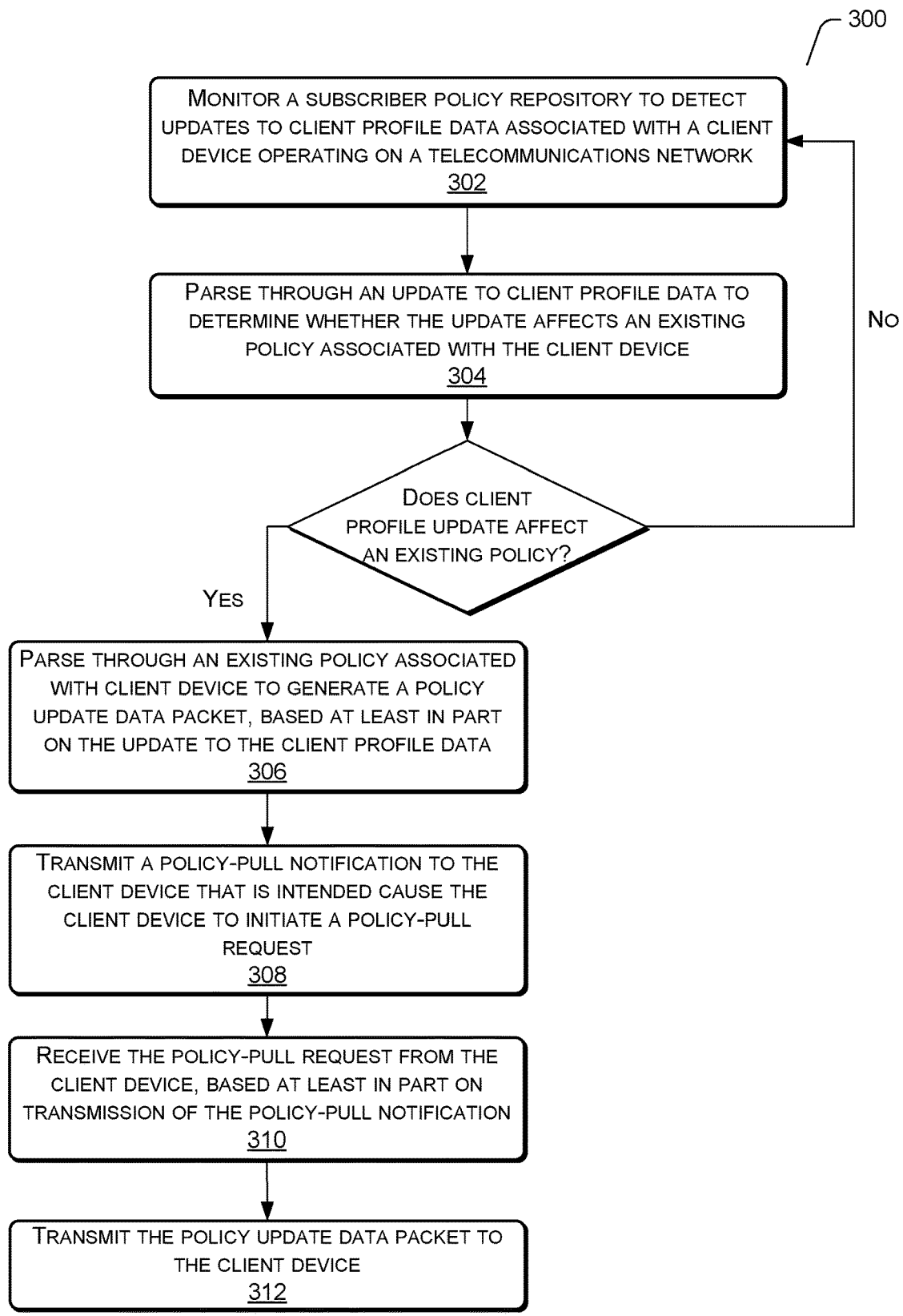
FIG. 3 illustrates a block diagram of a policy state propagation (PSP) system process that initiates a policy update in response to a change in client profile data that is associated with a client device operating on a telecommunications network.
Figure 4:
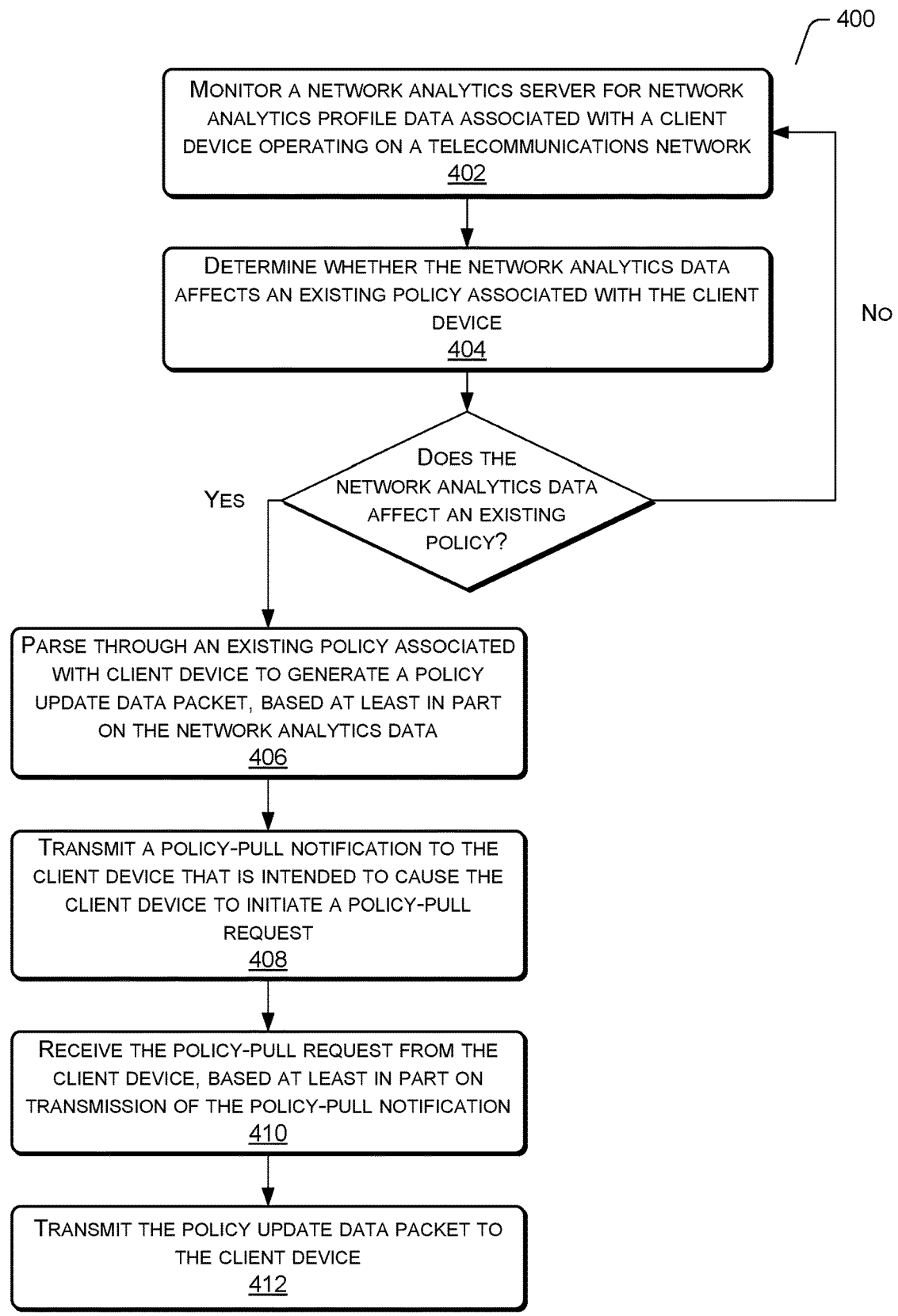
FIG. 4 illustrates a block diagram of a policy state propagation (PSP) system process that initiates a policy update in response to receipt of real-time network analytics.
Figure 5:
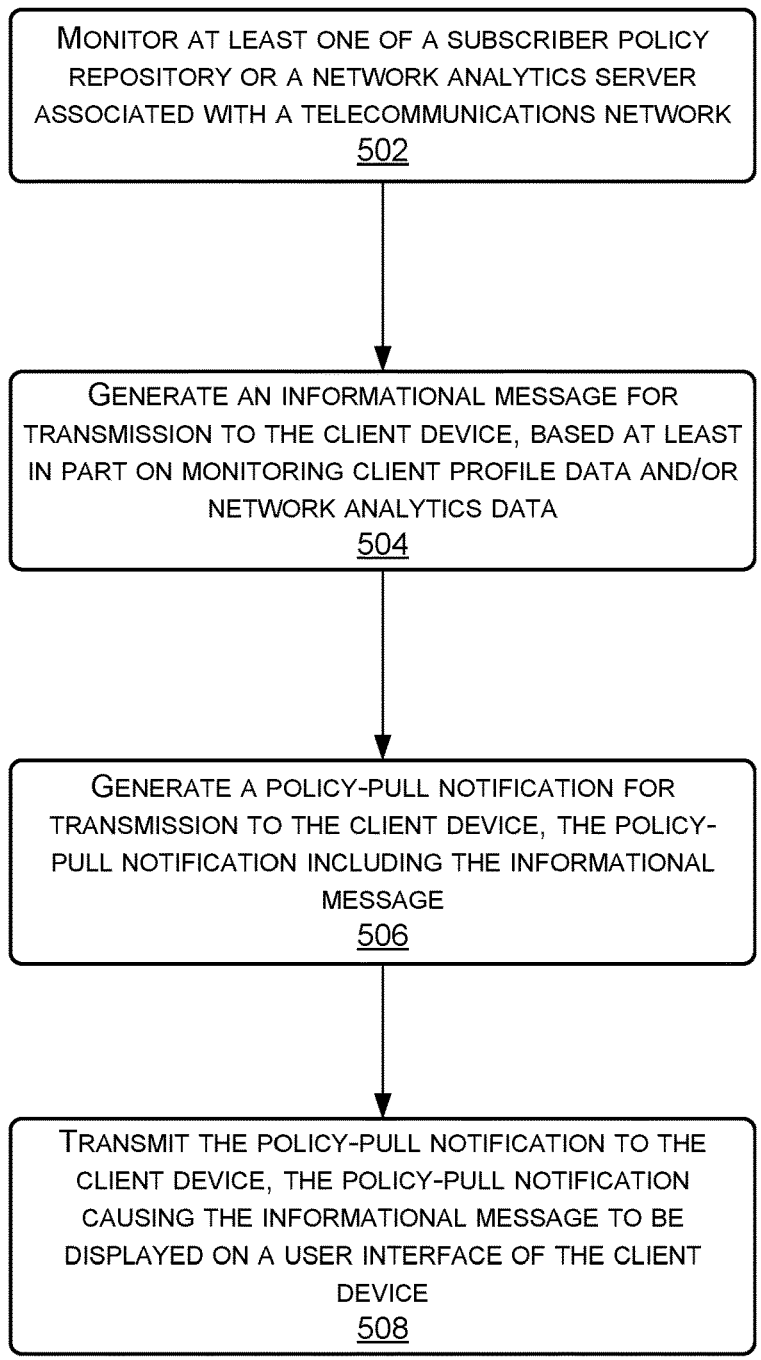
FIG. 5 illustrates a block diagram of a policy state propagation (PSP) system process that transmits an informational message, as part of a policy-pull notification, to a client device.

FIGS. 3, 4, and 5 present processes 300, 400, and 500 that relate to operations of the policy state propagation system. Each of processes 300, 400, and 500 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300, 400, and 500 are described with reference to the computing environment 100 of FIG. 1.

FIG. 3 illustrates a block diagram of a policy state propagation (PSP) system process that causes a client device to policy update to an existing policy associated with operations on a telecommunications network. In one example, the policy update may be responsive to a change in client profile data associated with a client device operating on a telecommunications network. Particularly, the PSP system may be configured to cause a client device to initiate a policy-pull request that is directed towards the core network of the telecommunications service provider, in response to the PSP system determining that a change in client profile data may affect an existing policy associated with the client device. The benefit of initiating a policy-pull request is that the client device may benefit from changes to policy rules that may affect network congestion of quality or experience (QoE), as it relates to data communications, proximate in time to the actual client profile update, itself.

At 302, the PSP system may monitor a subscriber policy repository to detect updates to client profile data associated with a client device operating on a telecommunications network. The PSP system may monitor the subscriber policy repository on a continuous basis, per a predetermined schedule, or in response to a triggering event. The triggering event may comprise of receiving an indication from a subscriber policy repository of the telecommunications network that an update to client profile data has occurred, and is available. In doing so, the PSP system may retrieve the updated client profile from the subscriber policy repository. Alternatively, the triggering event may comprise receiving the update of client profile data from the subscriber policy repository.

At 304, the PSP system may parse through an update to client profile data to determine whether the update affects an existing policy associated with the client device. In one example, an update to client profile data may correspond to adjusting a network subscriber plan associated with the client device. In this example, the update may affect an existing policy relating to offloading the client device onto a non-cellular network due to network congestion or offloading the client device due to improved QoE relative to the cellular network.

In some examples, an existing policy may comprise of one or more policy rules that govern availability and accessibility of non-cellular data networks, such as WiFi or WiMax. The one or more policy rules may be configured to ease network congestion or improve a QoE associated with the client device. In one example, the one or more policy rules may offload a client device onto a non-cellular data network during periods of cellular network congestion (i.e., real-time network congestion being greater than a predetermined congestion threshold). Additionally, or alternatively, the one or more policy rules may offload the client device in response to determining a proximity of the client device to a particular geographic region, a particular event, a particular venue, the time of day, the day of the week, or any combination thereof. In some examples, the one or more policy rules may prioritize an order of client devices that are to be offloaded onto a non-cellular network. The order of priority may be based at least in part on respective network subscriber plans associated with each of the client devices.

In another example, one or more policy rules may offload a client device onto a non-cellular data network based on QoE (i.e., bit rate or bandwidth allocation associated with a data communication). For example, one policy rule may be configured to offload client devices to a non-cellular data network, in response to determining that a first QoE associated with the non-cellular data network is greater than a second QoE associated with the cellular data network.

In the event that the PSP system determines that a client profile update does not affect an existing policy, the process 300 may return to step 302 and continue to monitor the subscriber policy repository.

At 306, the PSP system may determine that the client profile update does affect an existing policy associated with the client device. The PSP system may further retrieve the existing policy from a client policy repository, such as an ANDSF server, or a policy repository accessible via the ANDSF server. In doing so, the PSP system may parse through the existing policy to generate a policy update data packet. The policy update data packet may include one or more new, or modified, policy rules associated with the existing policy, based at least in part on the update to the client profile data.

At 308, the PSP system may transmit a policy-pull notification to the client device that is intended to instruct the client device to initiate a policy-pull request to receive an available, policy update. By way of example, the policy update may include an update to the client profile data and associated policy rules. In doing so, the client device is afforded an opportunity to benefit from the update, proximate in time to the actual update of client profile data. In one example, the PSP system may cause an ANDSF server of the telecommunications network to transmit the policy-pull notification to the client device. Alternatively, the PSP system may transmit the policy-pull notification directly to the client device.

In any case, providing the client device with a timely policy update allows the client device to avoid a measurable lag between the genesis an update to client profile data (i.e., change to network subscriber plan), and experiencing the benefit of the update (i.e., increase in data allocation or bandwidth allocation).

At 310, the PSP system may receive the policy-pull request from the client device initiated via the policy-pull notification. In one example, the policy-pull request may include an authentication token associated with the client device. The PSP system may verify an authenticity of the authentication token via a communicative exchange with the device entitlement server.

At 312, in response to authenticating the client device, the PSP system may transmit the policy update data packet to the client device. Alternatively, the PSP system may transmit the policy update data packet an access server, such as the ANDSF server, along with computer executable instructions that cause further transmission of the policy update data packet to the client device.

FIG. 4 illustrates a block diagram of a policy state propagation (PSP) system process that initiates a policy update in response to receiving real-time network analytics data. Particularly, the PSP system may be configured to cause a client device to initiate a policy-pull request to update an existing policy in response to receiving real-time network analytics. Real-time network analytics may include one or more of an indication of a location of a client device, and a level of network congestion experienced at the location of the client device, or a level of network congestion experienced at proximate locations neighboring the client device.

In response, the PSP system may determine whether to offload the client device onto a Wi-Fi or Wi-Max network, to relieve network congestion or improve QoE associated with the client device. Particularly, the PSP system may monitor a select number of client devices, and via machine learning, construct algorithms that may predict whether the select number of client devices are likely to move into a geographic region that is experiencing network congestion or a relatively poorer QoE.

At 402, the PSP system may monitor a network analytics server to detect network analytics data associated with a client device operating on a telecommunications network. The network analytics data may include location data associated with the client device, a first indication of network congestion within the telecommunications network at a substantially same location as the client device, and a second indication of network congestion within the telecommunications network at geographic regions that are substantially proximate to the location of the client device.

The PSP system may monitor the network analytics server on a continuous basis, per a predetermined schedule, or in response to a triggering event. The predetermined schedule may be based on a time interval of one hour, three hours, or 24 hours. Any time interval is possible. The triggering event may correspond to receiving network analytics data from a network analytics server associated with a client device.

At 404, the PSP system may determine whether the network analytics data affects an existing policy associated with the client device. In one example, the network analytics data may indicate a location of the client device and a real-time level of network congestion at a substantially same location as the client device. Thus, the PSP system may determine whether the network congestion at the location of the client device affects an existing policy associated with the client device.

In some examples, an existing policy may comprise of one or more policy rules that govern availability and accessibility of non-cellular data networks, such as WiFi or WiMax. The one or more policy rules may be configured to ease network congestion by offloading a client device onto a non-cellular data network during period of network congestion (i.e., real-time network congestion being greater than a predetermined congestion threshold. In another example, one or more policy rules may offload a client device onto a non-cellular data network based on a QoE (i.e., bit rate or bandwidth allocation associated with a data communication) of the cellular data network relative to the non-cellular data network.

In the event, that the PSP system determines that the network analytics data does not affect an existing policy, the process 400 may return to step 402 and continue to monitor the network analytics server.

At 406, the PSP system may determine that the network analytics data does affect an existing policy associated with the client device. The PSP system may further retrieve the existing policy from a client policy repository, such as an ANDSF server, or a policy repository accessible via the ANDSF server. In doing so, the PSP system may parse through the existing policy to generate a policy update data packet. The policy update data packet may create, or modify, one or more policy rules associated with the existing policy, based at least in part on the network analytics data.

At 408, the PSP system may transmit a policy-pull notification to the client device that is intended to instruct the client device to initiate a policy-pull request to receive an available policy update. In one example, the PSP system may cause an ANDSF server of the telecommunications network to transmit the policy-pull notification to the client device. Alternatively, the PSP system may transmit the policy-pull notification directly to the client device. In doing so, the client device is afforded an opportunity to benefit from the update, proximate in time to the PSP system receiving network analytics data from the network analytics server.

At 410, the PSP system may receive the policy-pull request from the client device. The policy-pull request may include an authentication token that is used to authenticate the client device via a device entitlement server. In one example, the PSP system may verify an authenticity of the authentication token via a communicative exchange with the device entitlement server.

At 412, in response to authenticating the client device, the PSP system may transmit the update to the existing policy to the client device. Alternatively, the PSP system may transmit the policy update data packet to an access server, such as the ANDSF server, along with computer executable instructions that cause further transmission of the policy update data packet to the client device.

FIG. 5 illustrates a block diagram of a policy state propagation (PSP) system process that transmits an informational message, as part of a policy-pull notification, to a client device. The informational message may relate an update of client profile data, or network analytics data. Particularly, the policy-pull notification may include computer executable instructions that cause the informational message to be displayed on a user interface of the client device. The informational message may relate to a client profile update, a network congestion status, or change in QoE status.

For example, the PSP system may receive an indication, from the subscriber policy repository, that a residential address associated with the client device has been updated. In doing so, the PSP system may determine that the updated residential address (i.e., client profile data) does not impact an existing policy associated with the client device. However, the PSP system may generate an informational message that describes the update and impact of the change in residential address, and further transmit the informational message to the client device as part of a policy-pull notification. It is noteworthy that the policy-pull notification may or may not include computer-executable instructions that further cause the client device to initiate a policy-pull request.

In another example, the PSP system may transmit the informational message to the client device, in conjunction with, or as part of, a policy-pull notification that is intended to cause the client to retrieve a policy update, via a policy-pull request. Particularly, the PSP system may generate a policy update data packet that creates new policy rules or adjusts existing policy rules associated with the client device. By way of example, the new policy rules, or adjusted policy rules may be intended to relieve network congestion by offloading the client device onto a non-cellular data network or improve a QoE associated with the client device. In any case, the PSP system may selectively transmit an informational message to the client device, in conjunction with, or as part of, the policy-pull notification. The informational message may indicate a nature of the policy update (i.e., offloading client device to a non-cellular network to relieve network congestion or improve QoE).

At 502, the PSP system may monitor at least one of a subscriber policy repository or a network analytics server associated with the telecommunications network. The PSP system may monitor the subscriber policy repository to detect updates to client profile data associated with a client device operating on the telecommunications network. Further, the PSP system may monitor the network analytics server to detect network analytics data associated with the client device.

At 504, the PSP system may generate an informational message for transmission to the client device, based at least in part on monitoring client profile data and/or receipt of network analytics data. The informational message may indicate a change in client profile data, such as a residential address, a business address, an email address, or a network subscriber plan. Additionally, or alternatively, the informational message may indicate whether an existing policy associated with the client device has been updated.

In one example, the PSP system may generate an informational message indicating that the client device is likely to experience network congestion at a particular geographic location, during a particular time interval, at a particular event, at a particular venue, or any combination thereof, based at least in part on network analytics data. By monitoring network analytics data, the PSP system may detect when the client device enters a geographic location affected by network congestion. The informational message may further recommend that the client device offload to a non-cellular data network to maintain a QoE and relieve network congestion. In this example, the informational message may be part of a policy-pull notification that may or may not include computer-executable instructions that further cause the client device to initiate a policy-pull request to retrieve a policy update data packet.

In another example, the PSP system may generate an informational message based on location data of the client device. For example, the content of the informational message may relate to a product or service offering that associated with an event or venue that is proximate to a current location of the client device.

At 506, the PSP system may generate a policy-pull notification for transmission to the client device. The policy-pull notification may include the informational message and may further include computer-executable instructions that cause the informational message to be displayed on a user interface of the client device.

At 508, the PSP system may transmit the policy-pull notification to the client device, causing the informational message to be displayed on the user interface of the client device. Alternatively, the PSP system may transmit the policy-pull notification to an access server, such as an ANDSF server, along with computer executable instructions cause further transmission of the policy-pull notification to the client device.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system comprising:
one or more processors;
memory coupled to the one or more processors, the memory including one or more modules that are executable by the one or more processors to:
receive client data associated with a client device, the client data including network analytics data associated with operating the client device on a telecommunications network;
retrieve, from a subscriber profile repository, a client profile associated with the client device, the client profile including a historical record of location data associated with the client device;
determine a current location of the client device and an indication of a network congestion at a proximate location to the current location of the client device, based at least in part on the network analytics data;
determine a duration of the network congestion, based at least in part on historical records of network congestion;
quantify a predetermined time interval that is associated with the client device entering the proximate location, based at least in part on the duration of the network congestion;
determine a likelihood that the client device is to enter the proximate location during the network congestion within the predetermined time interval, based at least in part on the historical record of location data;
generate a policy update data packet that includes at least one policy rule to offload the client device onto a non-cellular network in response to the likelihood that the client device is to enter the proximate location during the network congestion within the predetermined time interval; and
transmit a policy-pull notification to the client device, the policy-pull notification intended to cause the client device to initiate a policy-pull request for the policy update data packet.

2. The system of claim 1, wherein the client data corresponds to an update of client profile data associated with the client device, the update of client profile data including at least an update to a network subscriber plan, and wherein the one or more modules are further executable by the one or more processors to:
determine a Quality of Experience (QoE) threshold for data communications over the telecommunications network, based at least in part on the network subscriber plan; and
associate a new policy rule with an existing policy associated with the client device, the existing policy including one or more policy rules that govern an availability and accessibility of non-cellular networks to the client device, the new policy rule to offload the client device onto the non-cellular network based at least in part on the QoE threshold, and
wherein, the policy update data packet includes the new policy rule.

3. The system of claim 1, wherein the one or more modules are further executable by the one or more processors to:

associate a new policy rule with an existing policy, the new policy rule to offload the client device onto the non-cellular network based at least in part on an additional indication of network congestion at the current location of the client device being greater than a predetermined congestion threshold, and
wherein, the policy update data packet includes the new policy rule.

4. The system of claim 1, wherein the one or more modules are further executable by the one or more processors to:
retrieve, from a network analytics data store, the historical records of network congestion associated with the current location of the client device.

5. The system of claim 1, wherein the one or more modules are further executable by the one or more processors to:
receive, from the client device, the policy-pull request, the policy-pull request including an authentication token;
authenticate, via a device entitlement server of the telecommunications network, the client device, based at least in part on the authentication token; and
transmit, to the client device, the policy update data packet to the client device based at least in part on authentication of the client device.

6. The system of claim 1, wherein to transmit the policy-pull notification to the client device comprises acts that cause an access server associated with the telecommunications network to transmit the policy-pull notification to the client device, and wherein the one or more modules are further executable by the one or more processors to:
transmit, via the access server and to the client device, the policy update data packet.

7. The system of claim 1, wherein the one or more modules are further executable by the one or more processors to:
identify at least one of an event, a venue offering, or an instance of network congestion, based at least in part on the current location of the client device; and
transmit a notification to the client device, based at least in part on one of the event, the venue offering, or the instance of network congestion.

8. The system of claim 1, wherein the one or more modules are further executable by the one or more processors to:
determine a current Quality of Experience (QoE) that is associated with an operation of the client device on the telecommunications network, based at least in part on the client data, the current QoE corresponding to real-time bit-rate of data communications over the telecommunications network; and
retrieve, from the subscriber profile repository, the client profile associated with the client device, the client profile including an additional indication of a predetermined QoE threshold associated with the client device, and
wherein to generate the policy update data packet is further based at least in part on a comparison of the current QoE and the predetermined QoE threshold.

9. The system of claim 1, wherein the one or more modules are further executable by the one or more processors to:
retrieve, from the client profile associated with the client device, a Quality of Experience (QoE) threshold for data communications over the telecommunications network;

determine a first QoE for the data communications over the telecommunications network; and determine a second QoE for the data communications over the non-cellular network accessible at the current location of the client device, and wherein to generate the policy update data packet is further based at least in part on a comparison of the first QoE and the second QoE.

10. A computer-implemented method, comprising: under control of one or more processors:

receiving network analytics data associated with an operation of a client device on a telecommunications network, the network analytics data including at least location data associated with a current location of the client device and an indication of a network congestion at a proximate location to the current location of the client device;

retrieving, from a subscriber profile repository, a client profile associated with the client device, the client profile including a historical record of location data associated with the client device;

determining a duration of the network congestion, based at least in part on historical records of network congestion;

quantifying a predetermined time interval that is associated with the client device entering the proximate location, based at least in part on the duration of the network congestion;

determining a likelihood that the client device is to enter the proximate location during the network congestion within the predetermined time interval, based at least in part on the historical record of location data;

generating a policy update data packet that includes at least one policy rule to offload the client device onto a non-cellular network in response to the likelihood that the client device is to enter the proximate location during the network congestion within the predetermined time interval; and transmitting a policy-pull notification to the client device to initiate a policy-pull request for receipt of the policy update data packet.

11. The computer-implemented method of claim 10, further comprising:

retrieving, from a network analytics data store, historical instances of network congestion at the proximate location associated with the client device, and wherein, determining the duration of the network congestion at the proximate location is based at least in part on the historical instances of network congestion.

12. The computer-implemented method of claim 10, further comprising:

identifying at least one of an event or a venue offering that is associated with the current location of the client device or the proximate location to the current location; and causing an access server associated with the telecommunications network to transmit a notification to the client device, the notification being based at least in part on the event or the venue offering.

13. The computer-implemented method of claim 10, further comprising:

causing an access server associated with the telecommunications network to transmit the policy-pull notification to the client device; and transmitting, via the access server and to the client device, the policy update data.

14. The computer-implemented method of claim 10, further comprising:

determining a current Quality of Experience (QoE) associated with the operation of the client device on the telecommunications network, based at least in part on the network analytics data, the current QoE corresponding to a real-time bandwidth allocation associated with data communications of the client device over the telecommunications network; and comparing the current QoE associated with the client device with a predetermined QoE threshold, and wherein, generating the policy update data packet is further based at least in part on the current QoE being less than the predetermined QoE threshold.

15. One or more non-transitory computer-readable media storing computer executable instructions that, when executed on one or more processors, cause the one or more processors to perform acts comprising:

receiving client data that includes network analytics data associated with an operation of a client device on a telecommunications network;

retrieving, from a subscriber profile repository, a client profile associated with the client device, the client profile including a historical record of location data associated with the client device;

determining a current location of the client device and an indication of a network congestion at a proximate location to the current location of the client device, based at least in part on the network analytics data;

determining a duration of the network congestion, based at least in part on historical records of network congestion;

quantifying a predetermined time interval that is associated with the client device entering the proximate location, based at least in part on the duration of the network congestion;

determining a likelihood that the client device is to enter the proximate location during the network congestion within the predetermined time interval, based at least in part on the historical record of location data;

generating a policy update data packet that includes at least one policy rule to offload the client device onto a non-cellular network in response to the likelihood that the client device is to enter the proximate location during the network congestion within the predetermined time interval;

causing, an access server associated with the telecommunications network to transmit a policy-pull notification to the client device, the policy-pull notification intended to cause the client device to initiate a policy-request for the policy update data packet;

receiving a policy-pull request from the client device, the policy-pull request including an authentication token associated with the client device; and transmitting, to the client device, the policy update data packet, based at least in part on verifying an authenticity of the authentication token.

16. The one or more non-transitory computer-readable media of claim 15, further comprising:

determining that the client data includes an update to the client profile that includes an update to at least one of a client device identifier, a residential or business geographic location, a preferred social media platform, or a network subscriber plan; and transmitting, via the access server, a notification to the client device that is associated with the update to the client profile.

17. The one or more non-transitory computer-readable media of claim 15, wherein the policy update data packet includes computer executable instructions that add a new policy rule to an existing policy associated with the client device.

18. The computer-implemented method of claim 10, further comprising:
- receiving, the policy-pull request from the client device, the policy-pull request including an authentication token associated with the client device; and
- transmitting, the policy update data packet to the client device, based at least in part on verifying an authenticity of the authentication token.

19. The one or more non-transitory computer-readable media of claim 15, wherein the policy update data packet includes computer executable instructions that modify an existing policy associated with the operation of the client device on the telecommunications network.

20. The one or more non-transitory computer-readable media of claim 15, wherein transmitting the policy update data packet to the client device occurs via the access server.

* * * * *